(12) United States Patent
Minyard et al.

(10) Patent No.: US 6,487,606 B1
(45) Date of Patent: Nov. 26, 2002

(54) SYSTEM AND METHOD FOR DELIVERING MESSAGES THROUGH A TOTEM COMMUNICATIONS SYSTEM

(75) Inventors: Trenton C. Minyard, Richardson, TX (US); Gregory T. Stovall, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/195,067

(22) Filed: Nov. 18, 1998

(51) Int. Cl.[7] .............................................. G06F 15/16
(52) U.S. Cl. ...................... 709/251; 709/201; 709/208; 709/250; 370/450; 370/452; 710/261; 710/266
(58) Field of Search ................................ 709/200–203, 709/208–211, 234–235, 238–239, 242, 245–246, 249–251; 712/11, 14, 16, 28; 345/505, 506; 370/450, 452, 463; 710/260–266

(56) References Cited

U.S. PATENT DOCUMENTS

| | | | | | |
|---|---|---|---|---|---|
| 5,307,459 | A | * | 4/1994 | Petersen et al. | 709/250 |
| 5,414,831 | A | * | 5/1995 | Wilson et al. | 709/245 |
| 5,434,976 | A | * | 7/1995 | Tan et al. | 709/250 |
| 5,469,545 | A | * | 11/1995 | Vanbuskirk et al. | 709/234 |
| 5,664,116 | A | * | 9/1997 | Gaytan et al. | 709/234 |
| 5,717,855 | A | * | 2/1998 | Norman et al. | 709/250 |
| 5,745,693 | A | * | 4/1998 | Knight et al. | 709/224 |
| 5,764,896 | A | * | 6/1998 | Johnson | 709/250 |
| 5,790,804 | A | * | 8/1998 | Osborne et al. | 709/245 |
| 5,832,216 | A | * | 11/1998 | Szczepanek | 709/250 |
| 5,841,444 | A | * | 11/1998 | Mun et al. | 709/251 |
| 5,948,089 | A | * | 9/1999 | Wingard et al. | 709/251 |
| 5,978,838 | A | * | 11/1999 | Mohamed et al. | 709/208 |
| 6,101,321 | A | * | 8/2000 | Cok et al. | 709/251 |
| 6,115,776 | A | * | 9/2000 | Reid et al. | 709/250 |
| 6,128,311 | A | * | 10/2000 | Poulis et al. | 709/250 |

OTHER PUBLICATIONS

Moser, et al. "Totem: A Fault–Tolerant Multicast Group Communication System," *Communications of the ACM*, vol. 39, No. 4, (Apr. 1996) pp. 54–63.

* cited by examiner

Primary Examiner—Bharat Barot
(74) Attorney, Agent, or Firm—Carr Law Firm, L.L.P.

(57) ABSTRACT

An improvement is disclosed for a Totem system having a network and a plurality of host processors connectable to the network, each of which host processors includes a CPU and is configured for executing processes, wherein the improvement includes, for each host processor, a buffer memory and a co-processor for each host processor. The buffer memory is electrically connected to the CPU and configured for storing messages sent to or from the CPU. The co-processor is electrically connected for providing an interface between the network and the host processor, and is configured for responding to tokens and for delivering messages from the network to the buffer memory for retrieval by the CPU, and for delivering to the network messages stored in the buffer memory by the CPU.

25 Claims, 4 Drawing Sheets

SYSTEM AND METHOD FOR DELIVERING MESSAGES THROUGH A TOTEM COMMUNICATIONS SYSTEM

TECHNICAL FIELD

The invention relates generally to communication systems and, more particularly, to an improved method and system for configuring Totem communication systems.

BACKGROUND OF THE INVENTION

A number of systems have been developed for providing network communications among groups. One such system is a Totem ring system, in which a plurality of host processors are electrically connected to a bus, each of which host processors includes a Central Processing Unit (CPU) adapted for executing processes such as application programs, including call processing, database operations, or any process requiring fault tolerance. A Totem ring provides for the delivery of multicast messages and invokes operations in the same total order throughout a distributed system, thereby resulting in consistency of replicated data and simplified programming of applications. Totem systems are well known to those skilled in the art and are, for example, described in greater detail in an article entitled "Totem: A Fault Tolerant Multicast Group Communication System" by L. E. Moser et al., published in the April 1996, Vol. 39, No. 4 Edition of Communications of the ACM.

Totem systems manage a number of different aspects of a communications system. For example, message delivery is controlled using a token similar to that used in a token ring to identify which host processor may transmit onto the ring. Periodically, such as every few milliseconds, the token is sent around the ring to each host processor in sequence. As the token is received by each host processor, the host processor determines whether it has a message or data to transmit over the ring. If a host processor does not have a message or data to transmit over the ring, then it regenerates the token and sends it to the next host processor. Each such query, response, and token regeneration, however, requires the CPU of a host processor to stop executing a process, such as an application program, while it responds to, and regenerates, the token. Typically, a processor has nothing to communicate, thereby rendering the token unnecessary the vast majority of the time. Furthermore, when such a cycle occurs every few milliseconds, the processing overhead for a CPU becomes, not only unnecessary, but also significant.

Totem systems also provide for virtual synchrony upon which a process, such as an application program, is loaded onto two host processors, one of which is designated as an active processor and the other of which is designated as a standby processor. If the active processor fails, then execution of the process is transferred to the standby processor. Determination of a failed processor, though, requires that, periodically, certain membership queries be made, via token retransmits, of the processors that are "members" of the Totem system. Such queries, as well as system configuration settings and other administrative functions performed by the Totem system, impose processing overhead on the CPUs of each of the host processors, in addition to the overhead imposed by the regeneration and forwarding of the aforementioned token, and further decrease the operating efficiency of the processors. Not only is the operating efficiency of the processors decreased, but the detection time of a processor failure is also degraded because the processors cannot quickly retransmit tokens since they are engaged predominantly in processing applications.

Therefore, what is needed is a method and system for relieving the processing overhead on the CPUs of the host processors so that they may operate more efficiently.

SUMMARY OF THE INVENTION

According to the present invention, a Totem system having a plurality of host processors is improved by providing each host processor with a co-processor and buffer memory which operate as an interface between a CPU of each host processor and the network of the Totem system. The co-processors relieve the processing overhead on the CPUs, thereby enabling each CPU and host processor to operate more efficiently.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
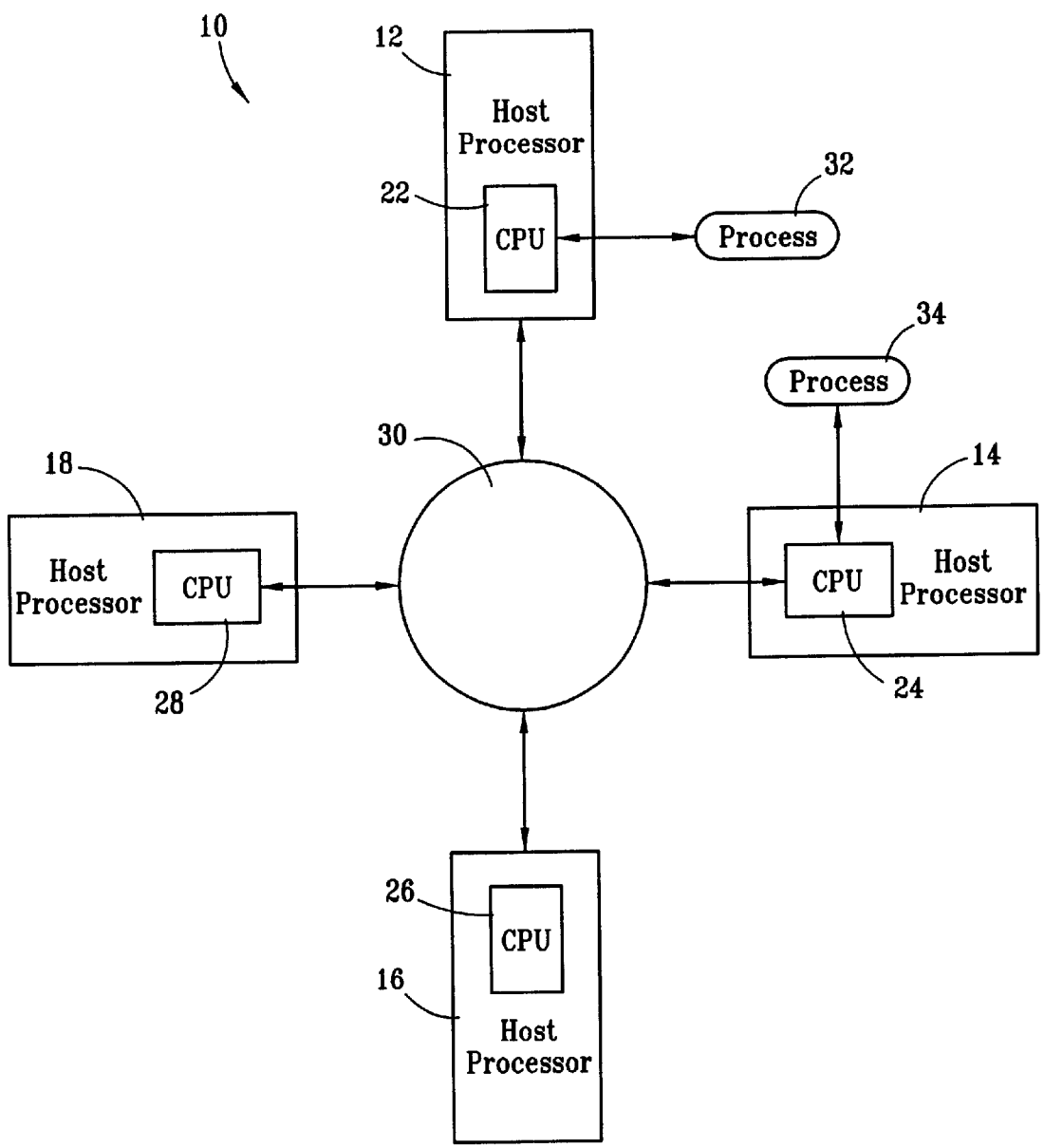
FIG. 1 is a schematic diagram showing a Totem ring embodying features of the prior art.

Referring to FIG. 1 of the drawings, the reference numeral 10 generally designates a Totem system embodying features of the prior art. The system 10 is generally operable over a broadcast network and includes four host processors 12, 14, 16, and 18, each of which has a central processing unit ("CPU") 22, 24, 26, and 28, respectively, electrically connected to a network 30 such as a 10-Mbit/s or 100-Mbit/s Ethernet. While four processors are shown, the number of processors may be more or less. The processors 12, 14, 16, and 18 may comprise any conventional computer generally capable of receiving, storing, processing, and outputting data, such as, for example, microcomputers, such as IBM PCs, IBM PC clones, Sun Microsystems IPCs running SunOS 4.1, or Sun SPARCstation 20s running Solaris 2.4. While not shown, the processors 12, 14, 16, and 18 include components, such as input and output devices, volatile and non-volatile memory, and the like, but, because such computer components are well known in the art, they are not shown or described further herein. Each of the CPUs 22, 24, 26, and 28 is adaptable for executing processes such as application programs, including call processing, database operations, and the like.

In a typical configuration, the host processors 12 and 14 will be loaded with substantially identical processes 32 and 34, respectively, such as application programs. With respect to the execution of the processes 32 and 34, one processor, such as the processor 12, is designated as an "active" processor, and the other processor, i.e., the processor 14, is designated as a "standby" processor. The active and standby processors 12 and 14, respectively, are configured so that the active processor 12 executes the process 32 until a fault occurs in the system 10 which prevents the active processor 12 from being able to execute the process, at which point execution of the process is transferred to the standby processor, which then becomes the active processor, and thereby provides fault tolerance in the system.

In the operation of the system 10 shown in FIG. 1, a token (not shown) is sent to each processor 12, 14, 16, and 18 in a predetermined sequential order. As the token is sent to each processor 12, 14, 16, and 18, execution of a process, such as an application program, by a respective CPU 22, 24, 26, and 28 is interrupted, and a determination is made by the respective CPU whether the processor has any message to communicate to the network 30 or to another processor connected to the network 30. If a processor, such as the processor 12, has a message to communicate, then its respective CPU 22 delivers the message to the network 30 with the address of the processor, such as the processor 14, to which the message is to be delivered. If a processor, such as the processor 14, does not have a message to deliver, then its CPU regenerates the token and sends it to the next processor. The CPU 22 or 26 of the processor 12 or 16, respectively, then resumes execution of the application program which it was performing prior to the interruption by the token. It can be appreciated that the interruption of a CPU by a token when it does not have a message to deliver, and the regeneration of the token, imposes unnecessary overhead on the CPU, which slows it down and renders it less efficient that it would otherwise be.

In addition to the overhead imposed by sending the token sequentially to each processor 12, 14, 16, and 18, and regenerating the token by each processor, the Totem system 10 also imposes many other overhead burdens onto each processor to provide the system 10 with fault tolerance. For example, as discussed above, the Totem system 10 provides for virtual synchrony whereby a standby processor, such as the processor 14, continues execution of a process, such as the process 34, when an active processor, such as the processor 12, fails. The Totem system 10 also provides for many membership and system configuration services involving, for example, the delivery of "join" and "commit" messages. The details of how these and other services provided by Totem systems are well known to those skilled in the art and are discussed in greater detail, for example, in the aforementioned article entitled "Totem: A Fault Tolerant Multicast Group Communication System" by L. E. Moser et al., published in the April 1996, Vol. 39, No. 4 Edition of Communications of the ACM, pp. 54–63, which article is incorporated in its entirety by reference herein. It is therefore considered unnecessary to discuss the operation and many services of a Totem system in greater detail herein. It can be appreciated, however, that such services necessitate interruptions of each CPU every few milliseconds and, as a result, add to a processor significant overhead which, in the majority of cases, is unnecessary.

Figure 2:
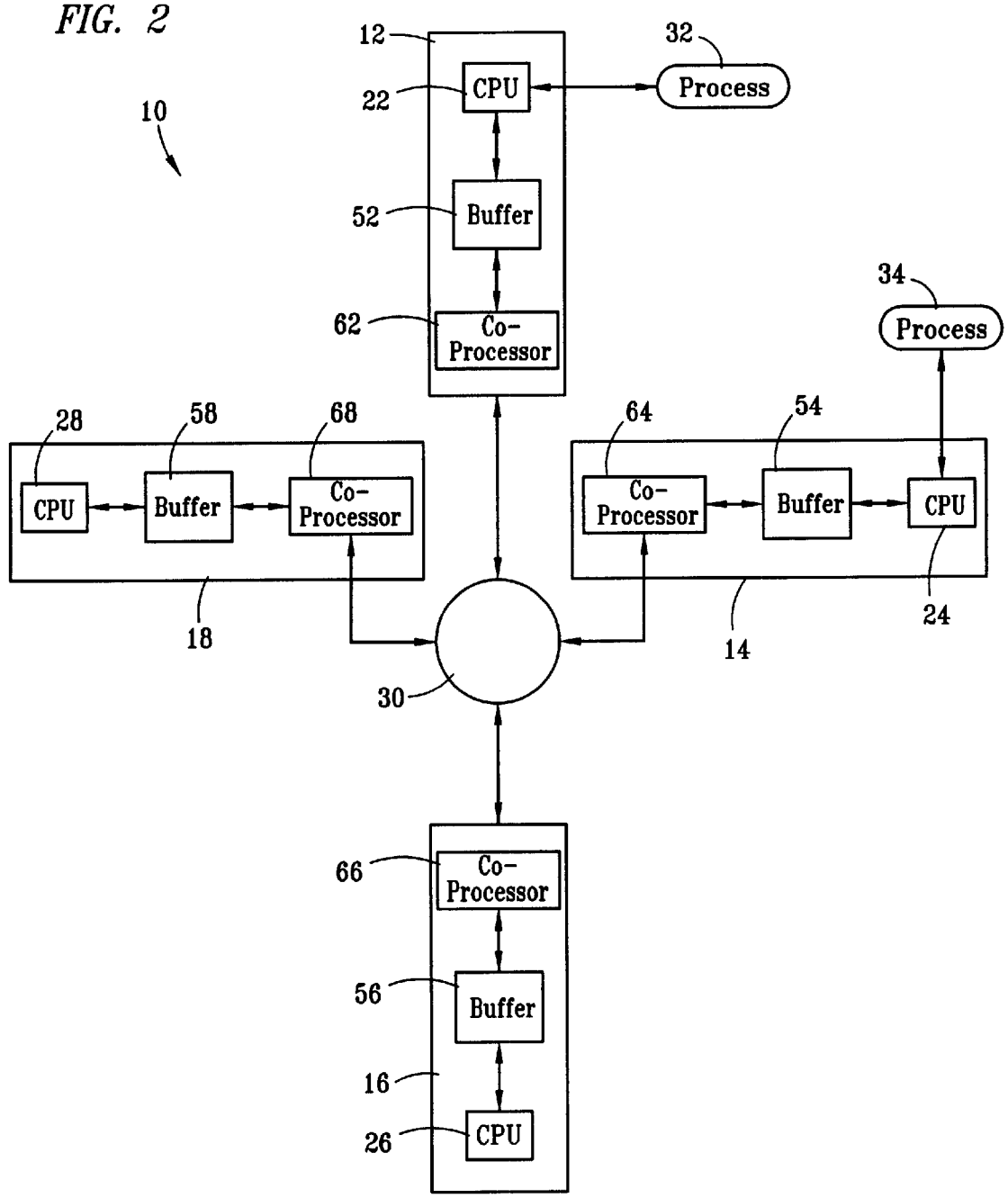
FIG. 2 is a schematic diagram showing a Totem ring embodying features of the present invention.

In FIG. 2, an embodiment of the present invention is shown which substantially reduces the processing overhead imposed by the Totem system 10 on each processor 12, 14, 16, and 18. The embodiment shown in FIG. 2 comprises a modification of the Totem system 10 in which the CPU 22, 24, 26, and 28 of each of the processors 12, 14, 16, and 18, respectively, are electrically connected in data communication to a buffer memory 52, 54, 56, and 58, respectively, such as conventional random access memory (RAM). Each buffer memory 52, 54, 56, and 58 is electrically connected in data communication to a co-processor 62, 64, 66, and 68, respectively, which is electrically connected in data communication to the network 30 for providing an interface between the respective CPU 22, 24, 26, and 28 and the network 30. The co-processors 62, 64, 66, and 68 may comprise any suitable processor, such as, for example, a PowerPC 604, an Intel Pentium, a RISC processor, or the like, and are provided with control logic, described below, for its operation.

Figure 3:
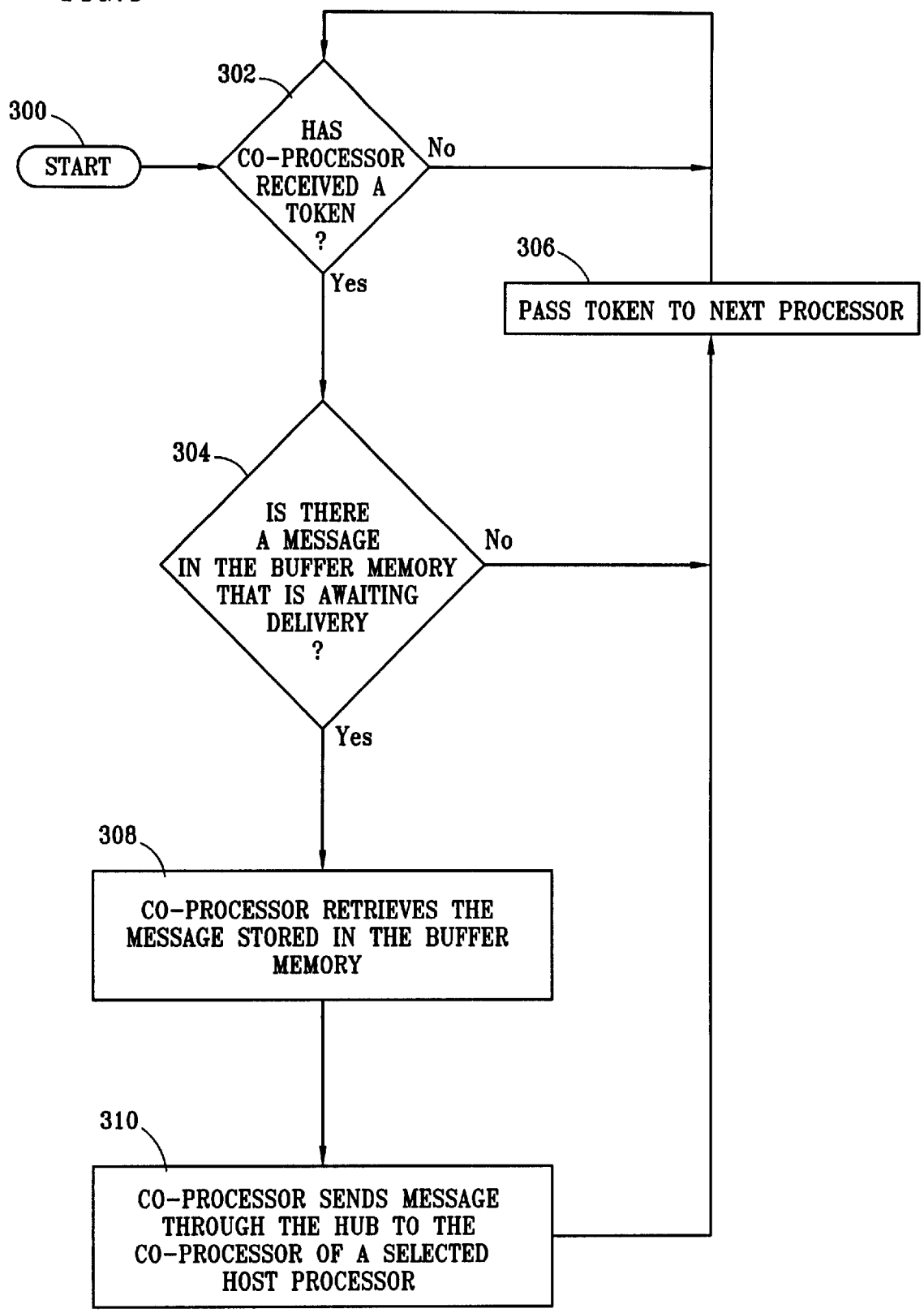
FIGS. 3–4 are a flow charts illustrating control logic for implementing the Totem ring shown in FIG. 2.

FIG. 3 is a flowchart of control logic which may be implemented by the co-processors 62, 64, 66, and 68 to operate as a front end interface between the network 30 and the CPUs 22, 24, 26, and 28 in accordance with the present invention. The control logic in each co-processor 62, 64, 66, and 68 is substantially identical and, for the sake of conciseness, will be exemplified by showing how a message, including data or an administrative or membership query message such as a join or commit message, is delivered from the host processor 12 to the host processor 16. Prior to or at any point during execution of the control logic by a co-processor 62, 64, 66, and 68, if a CPU 22, 24, 26, and 28 has a message to deliver, then it delivers such message to the buffer memory 52, without waiting for a token to send the message, thereby freeing up the CPU 22 to do other tasks.

In step 300, execution begins and, in step 302, the co-processor 62 of the host processor 12 determines whether it has received the token. If, in step 302, the co-processor 62 determines that it has not received the token, then execution returns to step 302; otherwise, execution proceeds to step 304. In step 304, the co-processor 62 determines whether there is a message in the buffer memory 52 (stored there by the CPU 22) that is awaiting delivery. If, in step 304, it is determined that there is not a message awaiting delivery, then execution proceeds to step 306. In step 306, the token is regenerated and sent to the next processor and execution returns to step 302. If, in step 304, it is determined that a message is awaiting delivery, then execution proceeds to step 308 in which the co-processor 62 retrieves the message stored in the buffer memory 52. In step 310, the co-processor 62 sends the retrieved message through the network to the co-processor 66 of the selected recipient host processor 16. Execution then proceeds to step 306, described above.

Figure 4:
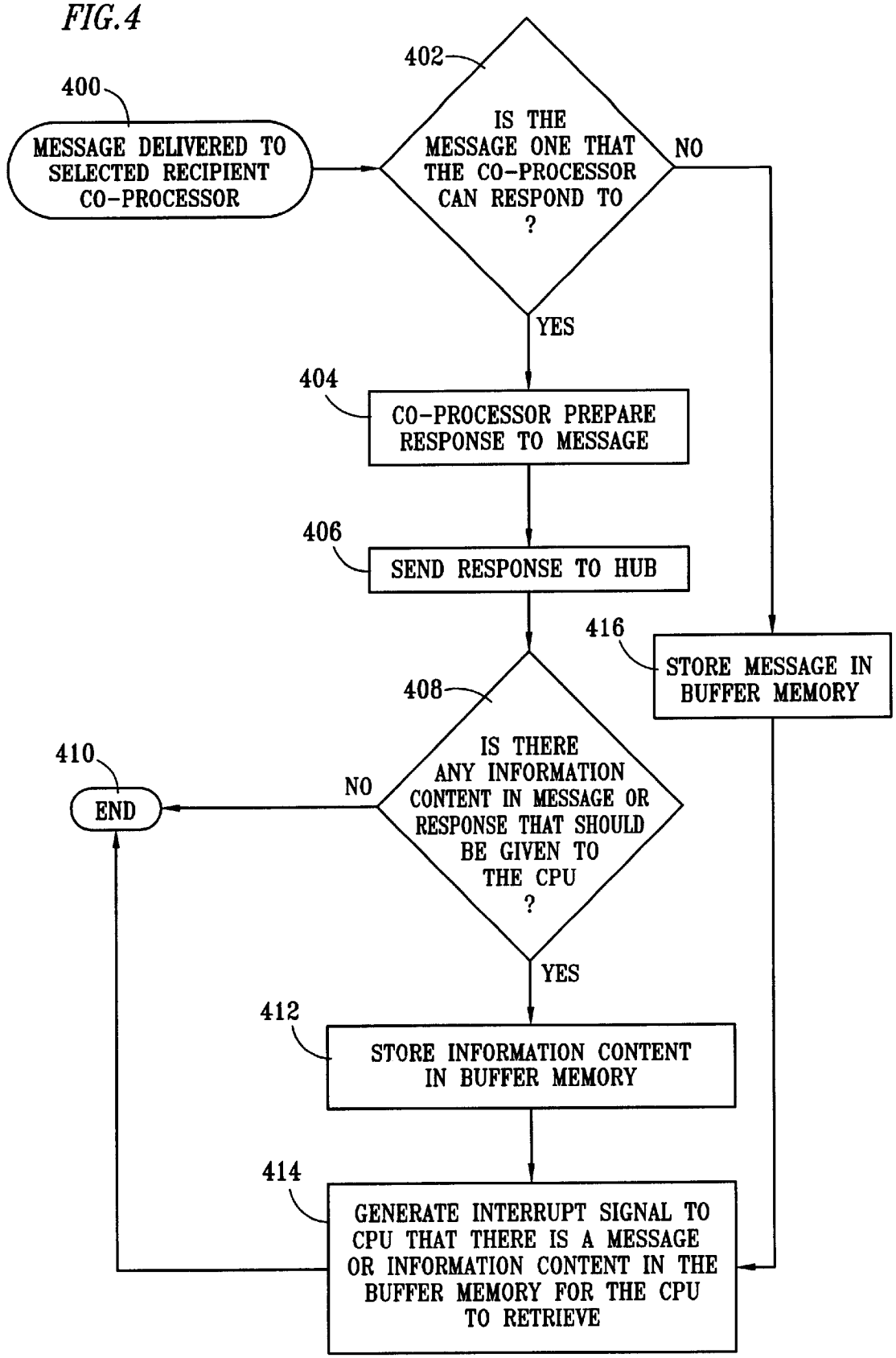

FIG. 4 shows the control logic implemented by the co-processor 66 upon receipt in step 400 of the message delivered in the foregoing step 310 (FIG. 3) to the selected recipient host processor. In step 402, the co-processor 66 determines whether the received message is a message, such as a membership query message, to which the co-processor 66 can respond. If the co-processor 66 determines that it can respond to the message, then, in step 404, it prepares a reply accordingly and, in step 406, it delivers the reply to the network 30. In step 408, the co-processor 66 determines whether any of the information content of the message or of the reply to the message should be forwarded to the CPU 26. If, in step 408, the co-processor 66 determines that no information content of the message or of the reply to the message should be forwarded to the CPU 26, then execution of the control logic terminates at step 410. If, in step 408, the co-processor 66 determines that at least some of the information content of the message or of the reply to the message should be forwarded to the CPU 26, then execution proceeds to step 412 in which such information content is stored in the buffer memory 56. Execution then proceeds to step 414 in which the co-processor 66 generates an interrupt signal to the CPU 26 to indicate that a message or information content reside in the buffer memory 56 for the CPU to retrieve. Upon receipt of the interrupt signal, the CPU 26 retrieves the message from the buffer memory 56, thereby completing the delivery of the message. Upon completion of step 414, execution terminates at step 410. If, in step 402, the co-processor 66 does not determine that it can respond to the message, then, in step 416, the co-processor 66 stores the information in its respective buffer memory 56 and execution proceeds to step 414. earliest Any message may be delivered from any host processor 12, 14, 16, or 18 to any other host processor a manner similar to that described above with respect to FIGS. 3–4.

By the use of the present invention, the processing overhead previously carried by the CPUs 12, 14, 16, and 18, may be largely carried by the respective co-processors 62, 64, 66, and 68, and the CPUs may be utilized more efficiently for performing other non-overhead tasks they were designed for. Because the co-processors 62, 64, 66, and 68 are dedicated to handling the administrative tasks of the Totem system, the token can be re-transmitted more quickly through the system, wait time for a token can be reduced, and failure of a token retransmit, and hence of a host processor, may be detected and remedied more quickly than in systems which do not utilize co-processors, thereby further enhancing the fault tolerance of the system. Because the co-processors are typically less expensive than the CPUs, they also provide a cost benefit when compared to the prior art.

It is understood that the present invention can take many forms and embodiments. Accordingly, several variations may be made in the foregoing without departing from the spirit or the scope of the invention. For example, the present invention may be used with Totem systems comprising multiple ring protocols as well as single ring protocols. Additionally, it may also be used with token bus systems. Furthermore, a communications chip (not shown), such as an Ethernet chip, may be provided for the co-processors in a manner well known to those skilled in the art for facilitating communication of data between the network 30 and each co-processor 52, 54, 56, and 58. Still further, the steps 402-408 and 410 depicted in FIG. 4 may be omitted. Still further, a host processor may be a standby host processor for more than one active host processor.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. An improved Totem system having a network and a plurality of host processors connectable to the network, each of which host processors includes a CPU and is configured for executing processes, wherein for each host processor the improvement comprises:

a buffer memory electrically connected to the CPU and configured for storing messages sent to or from the CPU; and a co-processor electrically connected between the network and the buffer memory for providing an interface between the network and the host processor, the co-processor being configured for responding to tokens received from the network and for delivering messages from the network to the buffer memory for retrieval by the CPU, and for delivering to the network messages stored in the buffer memory by the CPU, and wherein the co-processor is operable to store a received message in the buffer memory and to generate an interrupt signal to the CPU indicating to the CPU that a message resides in the buffer memory for the CPU to retrieve, and wherein the co-processor is operable to process the message and send a reply to the network without interrupting the CPU.

2. The system of claim 1 wherein each co-processor is operable in accordance with control logic, wherein:

in response to a token, the co-processor is operable to determine whether a message resides in the buffer memory which requires delivery to another host processor;

in response to a determination that a message resides in the buffer memory which requires delivery to another host processor, the co-processor is operable to retrieve the message and to deliver the message to the network for delivery to a selected host processor; and in response to a determination that a message does not reside in the buffer memory which requires delivery, the co-processor is operable to regenerate the token and send the token to a next processor.

3. The system of claim 1 wherein each co-processor is operable in accordance with control logic, wherein:

the co-processor is operable to determine whether a received message can be processed by the co-processor or must be sent to the CPU for processing;

in response to a determination that a message can be processed by the co-processor, the co-processor is operable to process the message and send a reply to the network;

the co-processor is operable to determine whether there is any information content in the message or reply that should be sent to the CPU;

in response to a determination that there is any information content in the message or reply that should be sent to the CPU, the co-processor is operable to store the information content in the buffer memory and to generate an interrupt signal to the CPU indicating that a message or information content resides in the buffer memory for the CPU to retrieve; and in response to a determination that the message must be sent to the CPU for processing, the co-processor is operable to store the message in the, buffer memory and to generate an interrupt signal to the CPU indicating that a message resides in the buffer memory for the CPU to retrieve.

4. The system of claim 1 wherein for each host processor the buffer memory comprises random access memory (RAM).

5. The system of claim 1 wherein for at least one host processor the process is an application program.

6. The system of claim 1 wherein each co-processor includes a communications chip electrically connected for interfacing the co-processor with the network.

7. The system of claim 1 wherein each co-processor includes an Ethernet communications chip electrically connected for interfacing the co-processor with the network.

8. The system of claim 1 wherein the Totem system is a Totem ring system operable over a broadcast network.

9. The system of claim 1 wherein the Totem system further comprises protocols for operating over a multiple ring network.

10. An improved token bus system having a network and a plurality of host processors connectable to the network, each of which host processors includes a CPU and is configured for executing processes, wherein for each host processor the improvement comprises:

a buffer memory electrically connected to the CPU and configured for storing messages sent to or from the CPU; and a co-processor electrically connected between the network and the buffer memory for providing an interface between the network and the host processor, the co-processor being configured for responding to tokens received from the network and for delivering messages from the network to the buffer memory for retrieval by the CPU, and for delivering to the network messages stored in the buffer memory by the CPU, and wherein the co-processor is operable to store a received message in it's buffer memory and to generate an interrupt signal to the CPU indicating to the CPU that a message resides in the buffer memory for the CPU to retrieve, and wherein the co-processor is operable to process the message and send a reply to the network without interrupting the CPU.

11. The system of claim 10, wherein each co-processor is operable in accordance with control logic, wherein:
in response to a token, the co-processor is operable to determine whether a message resides in the buffer memory which requires delivery to another host processor;
in response to a determination that a message resides in the buffer memory which requires delivery to another host processor, the co-processor is operable to retrieve the message and to deliver the message to the network for delivery to a selected host processor; and
in response to a determination that a message does not reside in the buffer memory which requires delivery, the co-processor is operable to regenerate the token and send the token to a next processor.

12. The system of claim 10 wherein each co-processor is operable in accordance with control logic, wherein:
the co-processor is operable to determine whether a received message can be processed by the co-processor or must be sent to the CPU for processing;
in response to a determination that a message can be processed by the co-processor, the co-processor is operable to process the message and send a reply to the network;
the co-processor is operable to determine whether there is any information content in the message or reply that should be sent to the CPU;
in response to a determination that there is any information content in the message or reply that should be sent to the CPU, the co-processor is operable to store the information content in the buffer memory and to generate an interrupt signal to the CPU indicating that a message or information content resides in the buffer memory for the CPU to retrieve; and
in response to a determination that the message must be sent to the CPU for processing, the co-processor is operable to store the message in the buffer memory and to generate an interrupt signal to the CPU indicating that a message resides in the buffer memory for the CPU to retrieve.

13. The system of claim 10 wherein the buffer memory comprises random access memory (RAM).

14. The system of claim 10 wherein the process is an application program.

15. The system of claim 10 wherein each co-processor includes a communications chip electrically connected for interfacing the co-processor with the network.

16. The system of claim 10 wherein each co-processor includes an Ethernet communications chip electrically connected for interfacing the co-processor with the network.

17. The system of claim 10 wherein the Totem system further comprises multiple ring protocols.

18. An improved method for delivering messages through a Totem system having a network and a plurality of host processors connectable to the network, each of which host processors includes a CPU, wherein for each host processor the improvement comprises:
connecting a buffer memory to the CPU for storing messages sent to and from the CPU; and
interconnecting a co-processor between the buffer memory and the network for providing an interface between the buffer memory and the network and, upon receipt of a message by the co-processor, for storing the message in the buffer memory and generating an interrupt signal to the CPU indicating that a message resides in the buffer memory for the CPU to retrieve, wherein the co-processor is operable to process the message and send a reply to the network without interrupting the CPU.

19. The method of claim 18 further comprising for each host processor:
determining by the co-processor, upon receipt of a token, whether a message resides in the buffer memory which requires delivery to the CPU;
upon making a determination by the co-processor that a message resides in the buffer memory which requires delivery to another host processor, retrieving the message by the co-processor and delivering the message to the network for delivery to a selected host processor; and
upon a determination by the co-processor that a message does not reside in the buffer memory which requires delivery to the another host processor, regenerating and sending the token to a next host processor.

20. The method of claim 18 further comprising for each host processor:
upon receipt of a message, making a determination by the co-processor whether the message can be processed by the co-processor or is one that must sent to the CPU for processing;
upon a determination by the co-processor that the message can be processed by the coprocessor, processing the message by the co-processor and sending a reply to the network;
making a determination by the co-processor whether there is any information content in the message or reply that should be sent to the CPU;
upon a determination by the co-processor that there is any information content in the message or reply that should be sent to the CPU, storing the information content in the buffer memory and generating an interrupt signal to the CPU indicating that a message or information content resides in the buffer memory for the CPU to retrieve; and
upon a determination by the co-processor that the message must be sent to the CPU for processing, storing the message in the buffer memory and generating an interrupt signal to the CPU indicating that a message resides in the buffer memory for the CPU to retrieve.

21. The method of claim 18 wherein for at least one host processor the process is an application program.

22. The method of claim 18 wherein each co-processor includes a communications chip electrically connected for interfacing the co-processor with the network.

23. The method of claim 18 further comprising operating the Totem system as a Totem ring system over a broadcast network.

24. The method of claim 18 further comprising operating the Totem system with multiple ring protocols.

25. An improved method for delivering messages through a Totem system having a network and a plurality of host processors connectable to the network, each of which host processors includes a CPU, wherein for each host processor the improvement comprises:
connecting a buffer memory to the CPU for storing messages sent to and from the CPU;

interconnecting a co-processor between the buffer memory and the network for providing an interface between the buffer memory and the network;

upon receipt of a message, making a determination by the co-processor whether the message can be processed by the co-processor or is one that must sent to the CPU for processing;

upon a determination by the co-processor that the message can be processed by the co-processor, processing the message by the co-processor and sending a reply to the network without interrupting the CPU;

making a determination by the co-processor whether there is any information content in the message or reply that should be sent to the CPU;

upon a determination by the co-processor that there is any information content in the message or reply that should be sent to the CPU, storing the information content in the buffer memory and generating an interrupt signal to the CPU indicating that a message or information content resides in the buffer memory for the CPU to retrieve; and upon a determination by the co-processor that the message must be sent to the CPU for processing, storing the message in the buffer memory and generating an interrupt signal to the CPU indicating that a message resides in the buffer memory for the CPU to retrieve.

* * * * *